(12) United States Patent
Dufosse

(10) Patent No.: US 9,574,461 B2
(45) Date of Patent: Feb. 21, 2017

(54) METHOD FOR CONTROLLING A THERMAL POWER PLANT USING REGULATED VALVES

(71) Applicant: ELECTRICITE DE FRANCE, Paris (FR)

(72) Inventor: Eve Dufosse, Paris (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 14/653,447

(22) PCT Filed: Dec. 18, 2013

(86) PCT No.: PCT/EP2013/077232
§ 371 (c)(1),
(2) Date: Jun. 18, 2015

(87) PCT Pub. No.: WO2014/096097
PCT Pub. Date: Jun. 26, 2014

(65) Prior Publication Data
US 2015/0337688 A1 Nov. 26, 2015

(30) Foreign Application Priority Data
Dec. 19, 2012 (FR) ...................................... 12 62334

(51) Int. Cl.
*F01K 1/00* (2006.01)
*F01K 13/02* (2006.01)
(Continued)

(52) U.S. Cl.
CPC . *F01K 1/10* (2013.01); *F01K 1/12* (2013.01); *F01K 3/04* (2013.01); *F01K 7/14* (2013.01);
(Continued)

(58) Field of Classification Search
CPC ................ F01K 3/04; F01K 3/12; F01K 1/12; F01K 7/08; F01K 7/14; F01K 7/16; F01K 7/18; F01K 7/20; F01K 7/26; F01K 13/02
(Continued)

(56) References Cited

U.S. PATENT DOCUMENTS 4,164,848 A    8/1979   Gilli et al.
4,214,450 A *   7/1980   Nagashima ........... F01K 23/106
                                                        60/39.182
(Continued)

FOREIGN PATENT DOCUMENTS

EP       1854964 A1    11/2007
FR       1134503 A      4/1957
(Continued)

OTHER PUBLICATIONS

Web-based steam property calculator available at http://www.peacesoftware.de/einigewerte/wasser_dampf_e.html; retrieved and utilized Apr. 20, 2016.*

(Continued)

*Primary Examiner* — Thomas Denion
*Assistant Examiner* — Mickey France
(74) *Attorney, Agent, or Firm* — Blakely Sokoloff Taylor & Zafman LLP

(57) ABSTRACT

A method of controlling a thermal power plant for electricity generation, said power plant comprising at least one heat source to supply thermal energy to a working fluid circulation circuit. The circuit comprises a high pressure turbine mechanically connected to an electricity generator, a high pressure regulating valve controlling the steam supply to said high pressure turbine from a high pressure superheater associated with a high pressure storage tank. The fluid supply to said high pressure storage tank from a high
(Continued)

pressure steam generator is controlled by a high pressure supply valve, and, in response to a need for additional electrical power, the opening of the high pressure regulating valve is increased the opening of the high pressure supply valve is reduced.

10 Claims, 1 Drawing Sheet

(51) Int. Cl.
*F01K 3/04* (2006.01)
*F01K 7/16* (2006.01)
*F01K 1/10* (2006.01)
*F01K 1/12* (2006.01)
*F01K 7/14* (2006.01)

(52) U.S. Cl.
CPC ............... *F01K 7/16* (2013.01); *F01K 13/02* (2013.01); *Y02E 20/16* (2013.01)

(58) Field of Classification Search
USPC ............... 60/645, 652, 659, 660, 662, 663, 667, 60/670, 677, 679, 39.182, 655
See application file for complete search history.

(56) References Cited

U.S. PATENT DOCUMENTS

| | | | |
|---|---|---|---|
| 4,274,256 A | 6/1981 | Kalt et al. | |
| 6,293,104 B1* | 9/2001 | Kangai | F28B 11/00 60/645 |
| 2010/0293948 A1* | 11/2010 | Berke | F01K 13/02 60/645 |
| 2011/0162368 A1* | 7/2011 | Schroder | F01K 3/12 60/670 |
| 2014/0033676 A1* | 2/2014 | Pang | F03G 6/00 60/39.182 |

FOREIGN PATENT DOCUMENTS

FR 2426158 A1 12/1979
JP 585415 A 1/1983

OTHER PUBLICATIONS

French preliminary search report for Application No. FR1262334, dated Oct. 16, 2013 (2 pages).
International Search Report Application No. PCT/EP2013/077232 dated Sep. 18, 2014 (7 pages).

* cited by examiner

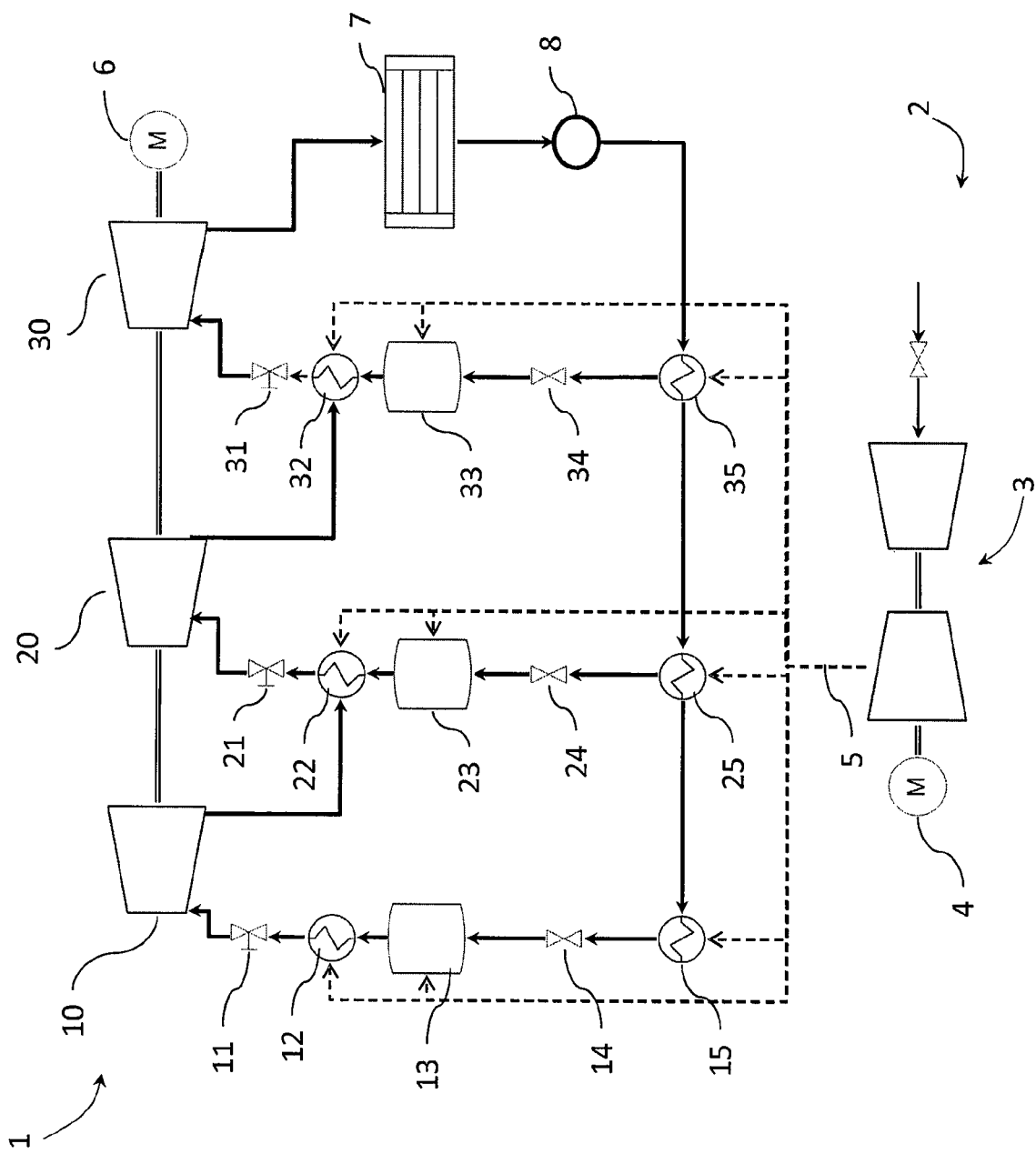

METHOD FOR CONTROLLING A THERMAL POWER PLANT USING REGULATED VALVES

TECHNICAL FIELD AND CONTEXT OF THE INVENTION

This invention relates to a method of controlling a thermal power plant for electricity generation, said power plant comprising at least one heat source to supply thermal energy to a working fluid circulation circuit, said circuit comprising at least a high pressure turbine mechanically connected to an electricity generator.

Preferably, the circuit also comprises at least one lower pressure turbine connected to an electricity generator, said lower pressure being less than high pressure of the high pressure turbine. Typically, there are two lower pressure turbines called the medium pressure turbine and the low pressure turbine respectively, the medium pressure turbine being on the downstream side of the high pressure turbine and on the upstream side of the low pressure turbine.

Normally, the electrical power is increased in response to a power demand by increasing the opening of a high pressure regulating valve that controls the steam supply to the high pressure turbine. The high pressure regulating valve is actually composed of a set of valves, but for reasons of clarity and simplicity, the description given below refers to one valve to denote a set of valves, so far as the valves in said sets perform the same function such that they can be considered like a single valve.

The high pressure regulating valve modulates the quantity of steam entering the high pressure turbine, and consequently entering the lower pressure turbines downstream from the high pressure turbine, such that electrical power generated by rotation of the turbines coupled to the electricity generator can be varied.

However, the additional electrical power that can thus be supplied remains limited and the thermodynamic equilibrium of the steam cycle is affected, possibly leading to problems in following the setpoint and/or with lower efficiency and/or with equipment overloads.

PRESENTATION OF THE INVENTION

One general purpose of the invention is to overcome some or all of the defects with control processes according to prior art.

In particular, a control process for such an electricity generation thermal power plant is disclosed, said power plant comprising at least one heat source to supply thermal energy to a working fluid circulation circuit, such circuit comprising at least:
a high pressure turbine mechanically connected to an electricity generator;
a high pressure regulating valve controlling the steam supply to said high pressure turbine from a high pressure superheater associated with a high pressure storage tank, the fluid supply to said high pressure storage tank from a high pressure steam generator being controlled by a high pressure supply valve;
and in response to a need for additional electrical power;
the opening of the high pressure regulating valve is increased;
the opening of the high pressure supply valve is reduced.

Such a process has the advantage that it can satisfy power demand much more efficiently while limiting the lack of equilibrium in the thermodynamic cycle.

Preferably, the circuit also comprises:
at least one lower pressure turbine connected to an electricity generator, said lower pressure being lower than the high pressure of the high pressure turbine;
a lower pressure regulating valve controlling the steam supply to said lower pressure turbine from a lower pressure superheater associated with a lower pressure storage tank, the fluid supply to said medium pressure storage tank originating from a lower pressure steam generator being controlled by a lower pressure supply valve, and the opening of the lower pressure regulating valve is increased in response to the demand for additional electrical power.

The available spare power is correspondingly increased, which can make control of the thermal power plant and management of the electricity network more flexible.

This device is advantageously complemented by the following characteristics, taken alone or in any technically possible combination of them:
in response to the demand for additional electrical power, the opening of the lower pressure supply valve is increased;
steam in the high pressure storage tank is at a temperature of between 300 and 350° C. and the density is between 60 and 80 kg·m$^{-3}$, and steam in the lower pressure storage tank is at a temperature between 200 and 250° C. and the density is between 7 and 11 kg·m$^{-3}$;
the electricity generation thermal power plant is a combined cycle plant, comprising a combustion turbine from which exhaust gases supply heat exchangers in the circuit;
a lower pressure turbine is a medium pressure turbine located downstream from the output from the high pressure turbine and upstream from a low pressure turbine.

The invention also relates to a computer program comprising program code instructions for execution of steps in the process according to the invention when said program is run on a computer. Typically, this computer program is in the form of a data medium that can be read by a computer.

The invention also relates to an electricity generation thermal power plant, said plant comprising at least one heat source to supply thermal energy to a working fluid circulation circuit, said circuit comprising at least:
a high pressure turbine mechanically connected to an electricity generator;
a high pressure regulating valve controlling steam supply to said high pressure turbine from a high pressure superheater associated with a high pressure storage tank, the fluid supply to said high pressure storage tank originating from a high pressure steam generator being controlled by a high pressure supply valve;
the power plant comprises means for controlling the high pressure regulating valve and means for controlling the high pressure supply valve, and is configured such that when a demand for additional electrical power is received;
the opening of the high pressure regulating valve is increased;
the opening of the high pressure supply valve is reduced.
Preferably, the circuit also comprises:
at least one lower pressure turbine connected to an electricity generator, said lower pressure being less than the high pressure of the high pressure turbine;
a lower pressure regulating valve controlling the steam supply to said lower pressure turbine from a lower pressure superheater associated with a lower pressure storage tank, the fluid supply to said lower pressure storage tank originating from a lower pressure steam generator being controlled by a lower pressure supply valve, and the power plant comprises means for controlling the lower pressure regulating valve and means for controlling the lower pressure supply valve, and it is configured such that the opening of the lower pressure regulating valve is increased in response to the need for additional electrical power. Also preferably, the power plant is configured such that the opening of the lower pressure supply valve is also increased in response to the demand for additional electrical power.

PRESENTATION OF THE FIGURES

Other characteristics, purposes and advantages of the invention will become clear from the following purely illustrative and non-limitative description that must be read with reference to FIG. 1 that is an overview illustrating the operating principle of a combined cycle gas type thermal power plant with its main components.

DETAILED DESCRIPTION

The invention will be better understood after reading the following description that refers to a power plant shown in FIG. 1, in which water is used as the working fluid.

Such a power plant comprises at least a combustion part 2 to supply thermal energy to a working fluid circulation circuit 1, in this case water in steam and liquid form. In this case, a combustion turbine 3 is mechanically connected to a generator 4 to generate electricity from combustion of a gas. Exhaust gases 5 output from this combustion, after passing through the combustion turbine 3, are distributed between different components of circuit 1 in order to form the heat source for said components, in this case heat exchangers performing various functions. Normally, these heat exchangers are distributed as a function of the temperature that they require: the hottest being upstream and the coldest being downstream from the path of the exhaust gases 5. However, for reasons of simplicity, the exhaust gas circuit is shown simply by arrows in dashed lines joining said heat exchangers to signal that they draw their heat from exhaust gases 5.

The circuit comprises three turbines: a high pressure turbine 10, a medium pressure turbine 20 and a low pressure turbine 30 through which the main steam circuit passes in succession.

At the outlet from the low pressure turbine 30, steam is condensed through a heat exchanger with an external cold source, this heat exchanger forming a condenser 7. The liquid water formed is then pumped by a pump 8 and then passes through various heat exchangers in which it is heated.

The last of these heat exchangers is a high pressure steam generator 15 supplied with heat by the exhaust gases 5. The water thus heated by this high pressure steam generator 15 then passes through a high pressure inlet valve 14 that controls the feedwater supply to a high pressure storage tank 13.

A storage tank contains some of the water in vapour form and some in liquid form. The liquid and vapour are under the same pressure and temperature conditions; the tank is in thermodynamic equilibrium. Heat may be supplied by exhaust gases 5 in order to maintain the required thermodynamic equilibrium. Feedwater in the liquid phase is brought in through the bottom of the storage tank, while steam in the vapour phase is drawn out from the top of the storage tank.

Once the steam has been drawn from the tank, it passes into a high pressure superheater 12 that heats the steam to obtain hotter steam that increases the efficiency of the cycle.

A high pressure regulating valve 11 controls the steam supply to the high pressure turbine from the high pressure superheater 12.

Steam then passes in the high pressure turbine 10 in which said steam is expanded. The high pressure turbine 10 thus converts energy contained in the steam into mechanical energy to rotate a shaft connected to an electricity generator 6.

There is a medium pressure steam generator 25 on the downstream side of the high pressure steam generator 15, supplied with heat from the exhaust gases 5, that heats the liquid water.

Some of the liquid water thus heated continues to the high pressure steam generator 15 while some of the heated water passes through a medium pressure inlet valve 24 that controls the liquid water supply to a medium pressure storage tank 23 that stores water at liquid/steam equilibrium.

Steam output from the medium pressure storage tank 23 then passes into a medium pressure reheater 22. The medium pressure reheater 22 is also supplied with steam from the outlet from the high pressure turbine 10.

This medium pressure reheater 22 thus plays two roles; it firstly heats steam output from the medium pressure storage tank 23 (therefore it performs the same function as the superheater 12 for high pressure), but it also heats steam expanded in the high pressure turbine 10. The passage of steam in a turbine reduces the temperature of the steam. Due to the medium pressure reheater 22, steam entering the medium pressure turbine 20 is hotter, which increases the efficiency of the cycle.

A medium pressure regulating valve 21 controls the steam supply to the medium pressure turbine 20 from the medium pressure reheater 22.

Therefore, steam enters the medium pressure turbine 20 in which said steam is expanded, through the medium pressure regulating valve 21. The medium pressure turbine 20 thus converts energy contained in the steam into mechanical energy to rotate the shaft connected to the electricity generator 6.

A low pressure steam generator 35 is arranged on the downstream side of the medium pressure steam generator 25, supplied with heat by the exhaust gases 5, that heats the liquid water.

Some of the liquid water thus heated continues to the medium pressure steam generator 25 while other liquid water passes through the low pressure inlet valve 34 that controls the supply of feedwater to a low pressure storage tank 33 that stores reheated water output from the low pressure steam generator 35.

Steam output from the low pressure storage tank 33 then passes into a low pressure reheater 32. The low pressure reheater 32 is also supplied with steam output from the medium pressure turbine 20.

This low pressure reheater 32 thus performs two roles; firstly, it heats the steam output from the low pressure storage tank 33 (it therefore performs the same function as the superheater 12 for high pressure) but it also heats steam expanded in the medium pressure turbine 20. When steam passes through a turbine, its temperature is reduced. Due to the low pressure reheater 32, steam entering the low pressure turbine 30 is hotter, which increases the efficiency of the cycle.

A low pressure regulating valve 31 controls the steam supply to the low pressure turbine 30 from the low pressure reheater 32.

Therefore, steam enters the low pressure turbine in which said steam is expanded, through the low 15, pressure regulating valve 31. The low pressure turbine thus converts energy contained in the steam into mechanical energy to rotate the shaft connected to the electricity generator 6.

Finally, steam returns to the condenser 7 to begin a new liquid/steam cycle.

If the electrical power has to be increased, the opening of the high pressure regulating valve 11 is increased. A larger opening of the high pressure regulating valve 11 increases the steam flow output from the high pressure storage tank 13 and the high pressure superheater 12, therefore entering into the high pressure turbine 10. The steam flow at the high pressure turbine 10 is therefore increased, which temporarily increases the power generated by the power plant.

Steam that exits from the high pressure storage tank 13 reduces the pressure in said high pressure storage tank 13 due to the reduction in the quantity of water molecules in the high pressure storage tank 13. Since the tank is in thermodynamic equilibrium, a reduction in the pressure will be compensated by the increase of the liquid level in the tank.

It might be thought that this pressure drop could be compensated by opening the high pressure supply valve 14 in order to restore the pressure in the high pressure storage tank 13 by increasing the quantity of water molecules in it. The applicant observed surprisingly that such an operation actually reduces the pressure inside said tank 13. In fact, water injected into the tank is colder than water already in the tank. Such an addition of water tends to reduce the temperature in the high pressure tank 13, and thus change the state of equilibrium to a new state of equilibrium. Water injected into the tank will reduce the saturation temperature, which reduces the saturation pressure, therefore the temperature and pressure are lower. Opening the high pressure supply valve 14 thus reduces the power generated due to the drop in the steam pressure.

Consequently, in order to increase the generated power, it is better to reduce the opening of the high pressure supply valve 14. Thus in response to a demand for additional electrical power:
  the opening of the high pressure regulating valve 11 is increased, and
  the opening of the high pressure supply valve 14 is reduced.

Therefore, the high pressure regulating valve 11 is opened to increase the power while the opening of the high pressure supply valve 14 is reduced to maintain sufficient pressure. The reduction in pressure in the storage tank is slowed by the reduction in the opening of the high pressure supply valve 14.

However, in order to limit the pressure drop in the high pressure storage tank 13, the power that can thus be generated by the high pressure storage tank 13 remains limited. A lower pressure storage tank is then used to increase the quantity of power generated, in this case formed from the medium pressure storage tank 23 or the low pressure storage tank 33 on which action is taken concomitant with the action on the high pressure storage tank 13.

In fact, the circuit comprises at least one lower pressure turbine connected to the electricity generator, said lower pressure being less than the high pressure in the high pressure turbine.

A lower pressure regulating valve controls the steam supply to said lower pressure turbine from a lower pressure superheater associated with a lower pressure storage tank, the fluid supply to said lower pressure storage tank originating from a steam generator being controlled by a lower pressure supply valve. The working fluid in the example in FIG. 1 is water.

In response to a demand for additional electrical power:
  the opening of the lower pressure regulating valve is increased;
  the opening of the lower pressure supply valve is increased.

Preferably, action is taken on the medium pressure storage tank 23 acting as the lower pressure storage tank, and the effects of the process in this case are described herein. More generally, action is preferably taken on the storage tank with the pressure closest to the pressure in the high pressure tank 13, and then afterwards action is taken (if necessary) on the low pressure storage tank 33.

As in the case for the high pressure turbine 10, opening of the medium pressure valve 21 increases the steam flow output from the medium pressure storage tank 23 that enters the medium pressure turbine 20, and this increases the power generated by the power plant.

However, unlike the high pressure case, opening of the medium pressure supply valve 24 surprisingly increases the pressure in the medium pressure storage tank 23. The result obtained is thus an increase in the power of the medium pressure turbine 20 due to both the increase in the steam quantity passing through this medium pressure turbine 20 and the increase in said steam pressure.

This surprising effect is due to the fact that the medium pressure reheater 22 is supplied with steam both by the medium pressure storage tank 23 and by the outlet from the high pressure turbine 10, the steam quantity from said outlet is increased by the concomitant opening of the medium pressure regulating valve 21. Due to this addition of steam from the high pressure turbine 10, the reduction in pressure in the medium pressure storage tank 23 is much lower than it is in the high pressure storage tank 13, even without the increased opening of the medium pressure supply valve 24.

The increased opening of the medium pressure supply valve 24 can then maintain or even increase the pressure in the medium pressure storage tank 23. Consequently, the additional power generated can be maintained for longer, and it may give better flexibility for monitoring the set power, both in the short term and the long term. The additional power generated due to the increase in steam flow and possibly the increase in the steam pressure in the medium pressure turbine 20 can compensate for the power reduction due to the drop in pressure in the high pressure turbine 10.

The results described above have been obtained for a power plant with the following operating conditions for steam, but obviously the power plant control process could be adapted by those skilled in the art to other configurations with operating conditions that could give the required results.

|  | High pressure tank | Medium pressure tank | Low pressure tank |
|---|---|---|---|
| Temperature (° C.) | 300-350 | 200-250 | 100-150 |
| Storage volume (m$^3$) | 40-50 | 7-11 | 6-10 |
| Steam density (kg/m$^3$) | 60-80 | 10-20 | 1-3 |

The process may be implemented using controllers well known to those skilled in the art, for example a single or several proportional integral (PI) controllers or proportional-integral-derivative (PID) controllers.

The invention claimed is:

1. A method of controlling a thermal power plant for electricity generation, said power plant comprising at least one heat source to supply thermal energy to a working fluid circulation circuit, said circuit comprising at least:
   a high pressure turbine mechanically connected to an electricity generator for generating electricity,
   a high pressure regulating valve controlling the steam supply to said high pressure turbine from a high pressure superheater, said high pressure superheater receiving steam from a high pressure storage tank associated with said high pressure superheater, the fluid supply to said high pressure storage tank from a high pressure steam generator being controlled by a high pressure supply valve arranged between said high pressure steam generator and said high pressure storage tank,
   wherein in response to a need for an increase in electrical power generated by the electricity generator,
   the opening of the high pressure regulating valve is increased
   the opening of the high pressure supply valve is reduced.

2. The control method according to claim 1, in which the circuit also comprises:
   at least one lower pressure turbine connected to an electricity generator, said lower pressure being lower than the high pressure of the high pressure turbine,
   a lower pressure regulating valve controlling the steam supply to said lower pressure turbine from a lower pressure superheater associated with a lower pressure storage tank, the fluid supply to said lower pressure storage tank originating from a lower pressure steam generator being controlled by a lower pressure supply valve,
   wherein in response to the demand for additional electrical power, the opening of the lower pressure regulating valve is increased.

3. The control method according to claim 2, wherein in response to the demand for additional electrical power, the opening of the lower pressure supply valve is increased.

4. The control method according to claim 1, in which steam in the high pressure storage tank is at a temperature of between 300 and 350° C. and the density is between 60 and 80 kg·m$^{-3}$, and in which steam in the lower pressure storage tank is at a temperature between 200 and 250° C. and the density is between 7 and 11 kg·m$^{-3}$.

5. The control method according to claim 1, in which the electricity generation thermal power plant is a combined cycle plant, comprising a combustion turbine from which exhaust gases supply heat exchangers in the circuit.

6. The control method according to claim 1, in which a lower pressure turbine is a medium pressure turbine located downstream from the output from the high pressure turbine and upstream from a low pressure turbine.

7. A computer-readable data medium storing program code instructions for, when said program code instructions are read by a computer, causing the execution of the steps of the method according to claim 1.

8. An electricity generation thermal power plant, said plant comprising at least one heat source to supply thermal energy to a working fluid circulation circuit, said circuit comprising at least:
   a high pressure turbine mechanically connected to an electricity generator for generating electricity,
   a high pressure regulating valve controlling steam supply to said high pressure turbine from a high pressure superheater, said high pressure superheater receiving steam from a high pressure storage tank associated with said high pressure superheater, the fluid supply to said high pressure storage tank originating from a high pressure steam generator being controlled by a high pressure supply valve arranged between said high pressure steam generator and said high pressure storage tank,
   wherein said power plant comprises means for controlling the high pressure regulating valve and means for controlling the high pressure supply valve, and said power plant is configured such that when a demand for an increase in generated electrical power is received by said power plant,
   the opening of the high pressure regulating valve is increased
   the opening of the high pressure supply valve is reduced.

9. The power plant according to claim 8, in which the circuit also comprises:
   at least one lower pressure turbine connected to an electricity generator, said lower pressure being less than the high pressure of the high pressure turbine,
   a lower pressure regulating valve controlling the steam supply to said lower pressure turbine from a lower pressure superheater associated with a lower pressure storage tank, the fluid supply to said lower pressure storage tank originating from a lower pressure steam generator being controlled by a lower pressure supply valve,
   wherein said power plant comprises means for controlling the lower pressure regulating valve and means for controlling the lower pressure supply valve, said power plant is configured such that the opening of the lower pressure regulating valve is increased in response to the need for additional electrical power.

10. The power plant according to claim 9, wherein the opening of the lower pressure supply valve is increased in response to the demand for an increase in generated electrical power.

* * * * *